US010823836B2

(12) United States Patent
    Wintermantel

(10) Patent No.: US 10,823,836 B2
(45) Date of Patent: Nov. 3, 2020

(54) RADAR SYSTEM HAVING INTERLEAVED SERIAL TRANSMITTING AND PARALLEL RECEIVING

(71) Applicant: Conti Temic microelectronic GmbH, Nuremberg (DE)

(72) Inventor: Markus Wintermantel, Lindau (DE)

(73) Assignee: Conti Temic microelectronic GmbH, Nuremberg (DE)

(*) Notice: Subject to any disclaimer, the term of this patent is extended or adjusted under 35 U.S.C. 154(b) by 326 days.

(21) Appl. No.: 15/776,217

(22) PCT Filed: Nov. 8, 2016

(86) PCT No.: PCT/DE2016/200504
    § 371 (c)(1),
    (2) Date: May 15, 2018

(87) PCT Pub. No.: WO2017/084661
    PCT Pub. Date: May 26, 2017

(65) Prior Publication Data
    US 2019/0265347 A1    Aug. 29, 2019

(30) Foreign Application Priority Data
    Nov. 19, 2015  (DE) .................. 10 2015 222 884

(51) Int. Cl.
    *G01S 13/58*    (2006.01)
    *G01S 7/35*     (2006.01)
    (Continued)

(52) U.S. Cl.
    CPC ............ *G01S 13/584* (2013.01); *G01S 7/354* (2013.01); *G01S 13/343* (2013.01); *G01S 13/42* (2013.01);
    (Continued)

(58) Field of Classification Search
    None
    See application file for complete search history.

(56) References Cited

U.S. PATENT DOCUMENTS 5,008,678 A    4/1991  Herman
5,202,742 A    4/1993  Frank et al.
            (Continued)

FOREIGN PATENT DOCUMENTS

DE    102005042729    3/2007
DE    102009016480    10/2010
            (Continued)

OTHER PUBLICATIONS

Communication Under EPO Rule 71(3) (Notice of Intent to Grant a Patent), European Patent Office, dated Jun. 11, 2019, including attached List of References Cited signed dated May 22, 2019, 7 pages, with partial English translation, 2 pages.
(Continued)

*Primary Examiner* — Whitney Moore
(74) *Attorney, Agent, or Firm* — W. F. Fasse

(57) ABSTRACT

An environmental detection method for a vehicle uses transmitting antennas to emit transmission signals that each consist of a sequence of identical or similar single signals, uses receiving antennas to receive the transmission signals reflected from objects, and processes the received signals. The transmission signals are emitted from only one transmitting antenna at a time, and the active transmitting antenna alternates cyclically from single signal to signal. All receiving antennas are always used in parallel. The received single signals are accumulated in proper phase for the different combinations of transmitting and receiving antennas to at least one relative speed hypothesis of objects. Digital beam formation is performed based on the accumulated signal values, each belonging to the same relative speed hypothesis, from different antenna combinations. Phase differences
(Continued)

between received signals from different transmitting antennas are thereby taken into consideration.

5 Claims, 12 Drawing Sheets

(51) Int. Cl.
G01S 13/34 (2006.01)
G01S 13/42 (2006.01)
G01S 13/87 (2006.01)
G01S 13/931 (2020.01)
H01Q 1/32 (2006.01)
G01S 13/72 (2006.01)

(52) U.S. Cl.
CPC .......... G01S 13/878 (2013.01); G01S 13/931 (2013.01); H01Q 1/3283 (2013.01); G01S 13/726 (2013.01); G01S 2007/356 (2013.01)

(56) References Cited

U.S. PATENT DOCUMENTS

| 5,454,442 | A | 10/1995 | Labuhn et al. |
| 5,523,764 | A | 6/1996 | Martinez et al. |
| 5,530,447 | A | 6/1996 | Henderson et al. |
| 5,579,021 | A | 11/1996 | Lee |
| 5,657,024 | A | 8/1997 | Shingyoji et al. |
| 5,686,923 | A | 11/1997 | Schaller |
| 5,717,399 | A | 2/1998 | Urabe et al. |
| 5,724,042 | A | 3/1998 | Komatsu et al. |
| 5,760,886 | A | 6/1998 | Miyazaki et al. |
| 5,815,112 | A | 9/1998 | Sasaki et al. |
| 5,825,333 | A | 10/1998 | Kudoh et al. |
| 5,877,726 | A | 3/1999 | Kudoh et al. |
| 5,940,011 | A | 8/1999 | Agravante et al. |
| 5,949,365 | A | 9/1999 | Wagner |
| 6,014,108 | A | 1/2000 | Lynch et al. |
| 6,057,797 | A | 5/2000 | Wagner |
| 6,091,363 | A | 7/2000 | Komatsu et al. |
| 6,097,332 | A | 8/2000 | Crosby, II |
| 6,127,965 | A | 10/2000 | McDade et al. |
| 6,130,640 | A | 10/2000 | Uematsu et al. |
| 6,204,755 | B1 | 3/2001 | Kikuchi |
| 6,232,910 | B1 | 5/2001 | Bell et al. |
| 6,396,448 | B1 | 5/2002 | Zimmerman et al. |
| 6,480,160 | B1 | 11/2002 | Bjornholt et al. |
| 6,492,949 | B1 | 12/2002 | Breglia et al. |
| 6,563,456 | B1 | 5/2003 | Hamman et al. |
| 6,577,269 | B2 | 6/2003 | Woodington et al. |
| 6,646,620 | B1 | 11/2003 | Bjornholt et al. |
| 6,657,581 | B1 | 12/2003 | Lippert et al. |
| 6,717,544 | B2 | 4/2004 | Nagasaku et al. |
| 6,750,810 | B2 | 6/2004 | Shinoda et al. |
| 6,833,806 | B2 | 12/2004 | Nagasuku et al. |
| 6,864,831 | B2 | 3/2005 | Woodington et al. |
| 6,897,819 | B2 | 5/2005 | Henderson et al. |
| 7,109,938 | B2 | 9/2006 | Franson et al. |
| 7,132,976 | B2 | 11/2006 | Shinoda et al. |
| 7,154,432 | B2 | 12/2006 | Nagasaku et al. |
| 7,173,561 | B2 | 2/2007 | Isaji |
| 7,187,334 | B2 | 3/2007 | Franson et al. |
| 7,268,722 | B2 | 9/2007 | Gottwald et al. |
| 7,346,453 | B2 | 3/2008 | Matsuoka |
| 7,362,259 | B2 | 4/2008 | Gottwald |
| 7,453,411 | B2 | 11/2008 | Nagai |
| 7,576,701 | B2 | 8/2009 | McGrath et al. |
| 7,630,061 | B2 | 12/2009 | Lehre et al. |
| 7,663,533 | B2 | 2/2010 | Toennesen et al. |
| 8,339,526 | B2 | 12/2012 | Minikey, Jr. et al. |
| 8,665,137 | B2 | 3/2014 | Wintermantel |
| 8,884,811 | B2 | 11/2014 | Zwick et al. |
| 2001/0026237 | A1 | 10/2001 | Okai et al. |
| 2002/0067314 | A1 | 6/2002 | Takimoto et al. |
| 2002/0163478 | A1 | 11/2002 | Pleva et al. |
| 2002/0175852 | A1 | 11/2002 | Zoratti et al. |
| 2005/0110673 | A1 | 5/2005 | Izumi et al. |
| 2005/0195383 | A1 | 9/2005 | Breed et al. |
| 2005/0231420 | A1 | 10/2005 | Brookner et al. |
| 2005/0285773 | A1 | 12/2005 | Hartzstein et al. |
| 2006/0066474 | A1 | 3/2006 | Shirakawa |
| 2006/0092076 | A1 | 5/2006 | Franson et al. |
| 2007/0001897 | A1 | 1/2007 | Alland |
| 2007/0152874 | A1 | 7/2007 | Woodington |
| 2007/0182619 | A1 | 8/2007 | Honda et al. |
| 2007/0205938 | A1 | 9/2007 | Zimmermann et al. |
| 2007/0222662 | A1 | 9/2007 | Toennesen et al. |
| 2007/0241978 | A1 | 10/2007 | Cheng |
| 2008/0046150 | A1 | 2/2008 | Breed |
| 2008/0303711 | A1 | 12/2008 | Matsuoka |
| 2008/0312830 | A1 | 12/2008 | Liu et al. |
| 2010/0033389 | A1 | 2/2010 | Yonak et al. |
| 2010/0149061 | A1 | 6/2010 | Haziza |
| 2011/0074620 | A1 | 3/2011 | Wintermantel |
| 2011/0080313 | A1 | 4/2011 | Wintermantel et al. |
| 2011/0080314 | A1 | 4/2011 | Wintermantel |
| 2011/0309971 | A1* | 12/2011 | Kanamoto ................ G01S 3/74 342/147 |
| 2015/0355319 | A1* | 12/2015 | Roger .................... G01S 13/42 342/147 |
| 2016/0025839 | A1* | 1/2016 | Trummer ............. H01Q 1/3233 342/109 |

FOREIGN PATENT DOCUMENTS

| DE | 102011009874 | 4/2012 |
| DE | 102011113015 | 3/2013 |
| EP | 0 831 553 | 3/1998 |
| EP | 0 947 852 | 10/1999 |
| EP | 1 548 458 | 6/2005 |
| EP | 2 294 451 | 3/2011 |
| JP | 2004-198312 | 7/2004 |
| KR | 1020070099195 | 10/2007 |
| WO | WO 2010/000252 | 1/2010 |
| WO | WO 2010/066458 | 6/2010 |
| WO | WO 2013/034282 | 3/2013 |

OTHER PUBLICATIONS

International Search Report of the International Searching Authority for International Application PCT/DE2016/200504, dated Feb. 28, 2017, 3 pages, European Patent Office, HV Rijswijk, Netherlands.
English translation of PCT International Preliminary Report on Patentability of the International Searching Authority for International Application PCT/DE2016/200504, dated Feb. 19, 2018, 6 pages, European Patent Office, Munich, Germany.
German Search Report for German Patent Application No. 10 2015 222 884.3, dated Dec. 23, 2015, 10 pages, Muenchen, Germany, with partial English translation, 7 pages.
Dominik Zoeke et al., "Phase Migration Effects in Moving Target Localization Using Switched MIMO Arrays", 12$^{th}$—2015 European Radar Conference, Sep. 9, 2015, XP032824509, pp. 85 to 88.
M. M. Abousetta et al., "On the use of some FMCW transmission schemes for radar angular resolution improvement", Radar 92 International Conference, Brighton UK, Jan. 1, 1992, pp. 335-339, BNSDOCID: XP006514831.
Daniel T. McGrath, "Calculation of Coupling Coefficients for Arrays With Skewed Lattices From Infinite Array Scan Reflection Data", IEEE Transactions on Antennas and Propagation, vol. 55, No. 7, Jul. 2007, pp. 2116-2119, IEEE Service Center, Piscataway, NJ, USA.

* cited by examiner

RADAR SYSTEM HAVING INTERLEAVED SERIAL TRANSMITTING AND PARALLEL RECEIVING

FIELD OF THE INVENTION

The invention relates to a radar system for use in driver assistance systems in a motor vehicle. According to the invention, the radar system has an arrangement and a method for interleaved serial transmitting and parallel receiving on, in each case, multiple antennas, including taking into consideration relative speed-dependent effects for the digital beam formation.

BACKGROUND INFORMATION

Motor vehicles are increasingly being equipped with driver assistance systems which detect the surroundings with the aid of sensor systems and derive automatic reactions of the vehicle and/or instruct, in particular warn, the driver from the thus recognized traffic situation. Here, a distinction is made between comfort and safety functions.

As a comfort function, FSRA (Full Speed Range Adaptive Cruise Control) plays the most important role in the current development. The vehicle adjusts the ego speed to the desired speed predefined by the driver, provided the traffic situation permits this, otherwise the ego speed is automatically adapted to the traffic situation.

In addition to increasing comfort, safety functions are increasingly being focused on, with one group being made up of functions for reducing the braking or respectively stopping distance in emergency situations; the range of the corresponding driver assistance functions extends from an automatic prefilling of the brake in order to reduce the braking latency (prefill) via an improved braking assistant (BAS+) up to autonomous emergency braking. Another group is made up of lane change functions: they warn the driver or respectively take over the steering if the driver would like to perform a hazardous lane change, that is to say if a vehicle is either located in the blind spot on the adjacent lane (which is referred to as BSD—"Blind Spot Detection") or is rapidly approaching from behind (LCA—"Lane Change Assist").

Nowadays, radar sensors are mainly used for driver assistance systems of the type described above. These also work reliably in poor weather conditions and can measure, in addition to the distance of objects, their radial relative speed directly as well via the Doppler effect. Here, 24 and 77 GHz are used as transmission frequencies.

In order to safely implement the above functions, a high quality of detection including reliable lane assignment of the objects is necessary; this requires an accurate angle formation. Today, angle formation is usually realized by multiple individual antennas and the merger thereof by digital beam formation; the more antenna channels this beam formation uses, the better the angle formation will be.

In order to obtain a high number of antenna channels for an acceptable hardware outlay, multiple transmitting and multiple receiving antennas are preferably used. In a suitable arrangement, the number of the antenna channels of the digital beam formation is the product of the number of transmitting antennas and the number of receiving antennas. Such arrangements are depicted in the specifications EP 000002294451 A2 and WO 2010/066458 A1.

EP 000002294451 A2 shows an arrangement and a method, in which the transmitting and the receiving antennas are serially operated in an interleaved manner—therefore in each case, transmitting is done on only one antenna and receiving is done on one antenna thanks to periodic alternations. The hardware outlay required for this is low, but the disadvantage is the lower sensor sensitivity. Due to the temporally offset operation of the antenna channels, objects moved relative to the sensor produce phase offsets between the antenna channels, which is to be taken into consideration during the angle formation; this is easily possible in the case of the interleaved serial transmitting and receiving depicted in the specification. Alternatively, parallel transmitting and receiving are also depicted in this specification; all of the transmitting and receiving antennas are therefore always operated simultaneously. This increases the sensor sensitivity, but also the hardware outlay. The problem of temporal offsets with respect to the angle formation no longer arises, therefore receiving signals originating from the different transmitting antennas have to be separated by way of modulation with the aid of phase switches and subsequent digital demodulation.

In WO 2010/066458 A1, a construction is depicted, which lies between the two above "extremes": transmitting is always done in an interleaved serial manner and receiving is always done in a parallel manner, i.e. only one transmitting antenna operates alternately, but all of the receiving antennas always operate simultaneously. Therefore, a good sensor sensitivity can be realized with an acceptable hardware outlay. Admittedly, the temporal offset between the transmitting antennas and its effect on the angle formation cannot be handled as easily with this arrangement as during serial transmitting and receiving. It is proposed in this specification WO 2010/066458 A1 that two antenna channels, which use different transmitting antennas, be situated at effectively the same location, so that the phase offset of their receiving signals only comes from the relative movement of the objects and, therefore, the relative speed-based phase offset of the other antenna channels is also known and can be compensated. This approach does admittedly have a few disadvantages: in particular, the maximum number of different antenna channels cannot be realized and, in the case of weak objects and in situations with multiple equally rapid and equally far-away objects, the estimation of the phase offset is extremely fuzzy or respectively distorted (since it is only determined from two antenna channels), which can result in angle errors and ghosts.

SUMMARY OF THE INVENTION

An object of the invention is to overcome, during interleaved serial transmitting and parallel receiving, the disadvantages described above of the previously known approach for taking into consideration the relative speed-related phase offsets between the antenna channels.

This object can be achieved with the aid of a method and a radar system according to the invention as set forth herein.

The advantages of the invention result from the fact that, for interleaved serial transmitting and parallel receiving, the maximum possible number of antenna channels and, consequently, optimum accuracy and resolution capability can be realized for the angle formation, on the one hand, and, in the case of weak objects and in situations with multiple equally rapid and equally far-away objects the angle formation is not negatively affected, on the other hand.

DETAILED DESCRIPTION OF EXAMPLE EMBODIMENTS OF THE INVENTION

Figure 1:
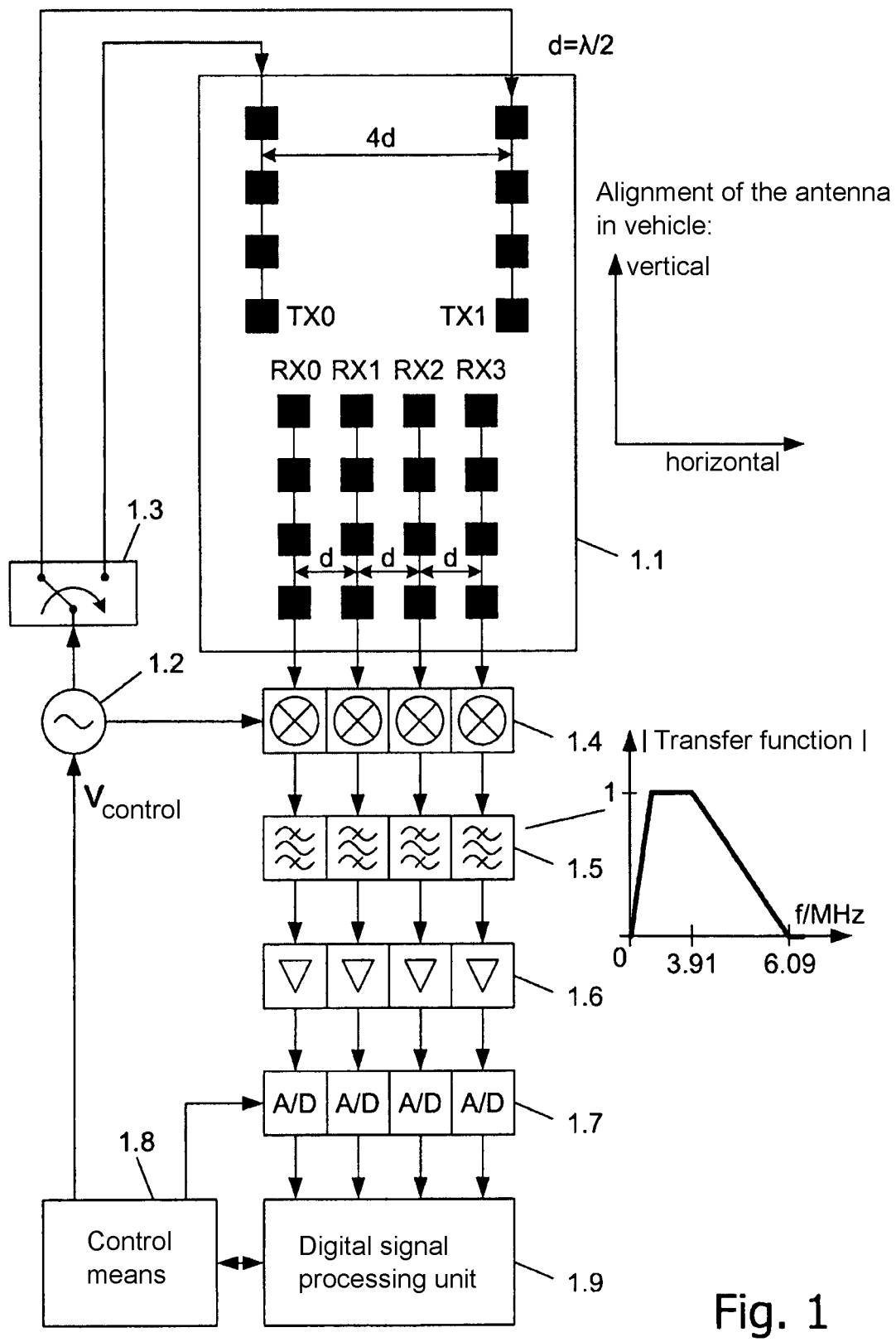
FIG. 1 depicts the exemplary embodiment of a radar system.

The exemplary embodiment of a radar system, which is roughly depicted in FIG. 1, is considered. The radar system has 2 transmitting antennas TX0 and TX1 for emitting transmission signals and 4 receiving antennas RX0-RX3 for receiving transmission signals reflected off objects; the antennas are embodied as patch antennas on a planar board 1.1 in planar technology, wherein this board is oriented with respect to the horizontal and vertical direction in the vehicle as depicted in the drawing. All of the antennas (transmitting and receiving antennas) have the same emission characteristic in elevation and azimuth. The 4 receiving antennas (and thus their phase centers, i.e. emission centers) each have the same lateral, i.e. horizontal, distance $d=\lambda/2=6.2$ mm with respect to each other, wherein $\lambda=c/24.15$ GHz=12.4 mm is the mean wavelength of the emitted signals; the horizontal distance of the two transmitting antennas with respect to each other is 4 times as large, i.e. it amounts to $4d=2\lambda$.

One of the two transmitting antennas can, in each case, be selected via the multiplexer 1.3. The transmission signals emitted on the respectively selected transmitting antenna are gained from the high-frequency oscillator 1.2 in the 24 GHz range, which can be changed in its frequency via a control voltage $v_{control}$; the control voltage is generated in the control means 1.8.

The signals received by the four receiving antennas are processed in parallel. First of all, they are equally down-mixed in the real-valued mixer 1.5 with the signal of the oscillator 1.2 into the low frequency range. Thereafter, the receiving signals each pass through one of the bandpass filters 1.5 with the depicted transfer function, one of the amplifiers 1.6 and one of the A/D converters 1.7; they are subsequently further processed in a digital signal processing unit 1.9. It should be stressed that the parallel processing of the four receiving antennas allows the receiving signals to be accumulated for four times longer than serial processing, which increases the sensor sensitivity by 6 dB.

Figure 2:
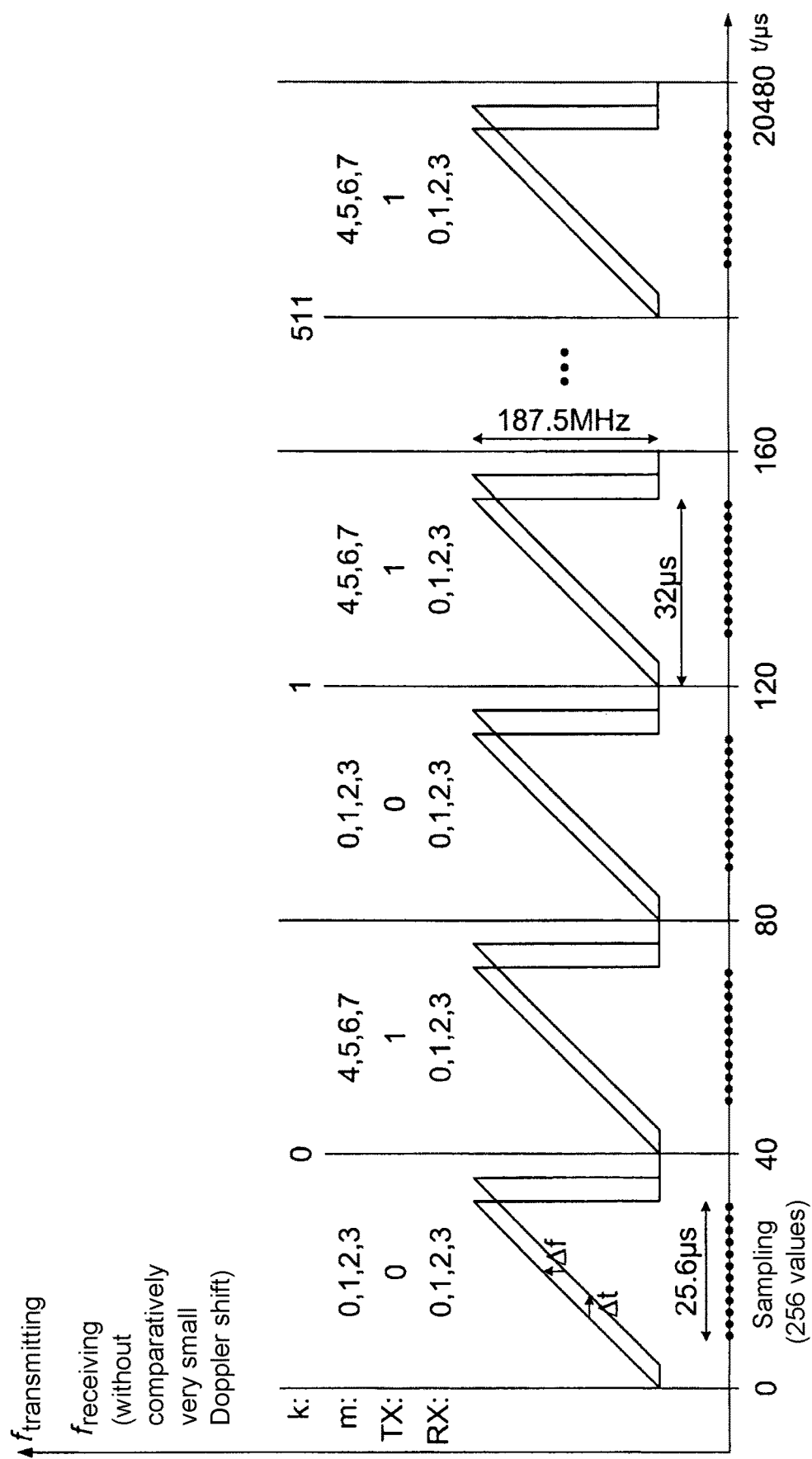
FIG. 2 shows the frequency of the transmitting and the receiving signals, which consists of so-called frequency ramps, as well as the antenna combinations used in each case, consisting of transmitting and receiving antennas.

To enable the distance of objects to be measured—as depicted in FIG. 2—the frequency of the high-frequency oscillator and thus of the transmission signals is very quickly changed in a linear manner (by 187.5 MHz in 32 µs); this is referred to as a frequency ramp. The frequency ramps are periodically repeated (every 40 µs); in total there are 512 frequency ramps. The two transmitting antennas are operated alternately via the frequency ramps, i.e. a switch is made to the other respective transmitting antenna before each frequency ramp. In FIG. 2, k is the indexed variable over the 512/2=256 frequency ramps for each transmitting antenna and $m=4 \cdot m_{TX}+m_{RX}$ is the indexed variable over the 8 antenna combinations $TXm_{TX}/RXm_{RX}$.

The receiving signal of an individual point-shaped object is a sinusoidal oscillation following mixing and thus also at the A/D converter for each frequency ramp and each of the four receiving channels; this can be explained with the aid of FIG. 2 as follows: if the object has the radial relative speed zero to the radar system, then the frequency difference $\Delta f$ between the transmitted signal and the received signal is constant and thereby proportional to the signal propagation time $\Delta t$ and thus proportional to the radial distance $r=c \cdot \Delta t/2$, wherein c is the speed of light and the factor ½ considers that the propagation time $\Delta t$ refers to the forth and back propagation of the wave; the resulting frequency difference $\Delta f$ with the above construction is $\Delta f=2r/c \cdot 187.5$ MHz/8 µs=$r \cdot 156.250$ kHz/m. Since the received signal is mixed with the oscillator and thus with the transmission frequency in each receiving channel, a sinusoidal oscillation with the frequency $\Delta f$ results in each case after the mixer. This frequency lies in the MHz-range and is still shifted with a non-vanishing radial relative speed by the Doppler frequency which, however, only lies in the kHz-range and which is, therefore, approximately negligible compared to the frequency portion due to the object distance. If there are several objects, then the receiving signal is a superposition of multiple sinusoidal oscillations of different frequency.

During each frequency ramp, the receiving signals in all 4 receiving channels are sampled in each case 256 times at the A/D converter at the distance of 100 ns (i.e. with 10 MHz) (see FIG. 2). As is apparent from FIG. 2, a signal sampling only makes sense in the time range in which receiving signals of objects arrive in the receivable distance range—therefore, following the ramp start, it is necessary to wait for at least the propagation time corresponding to the maximum receivable distance (at a maximum distance of 150 m this corresponds to 1 µs). It should be noted that the term "distance" always denotes the radial distance both here and below.

Figure 3:
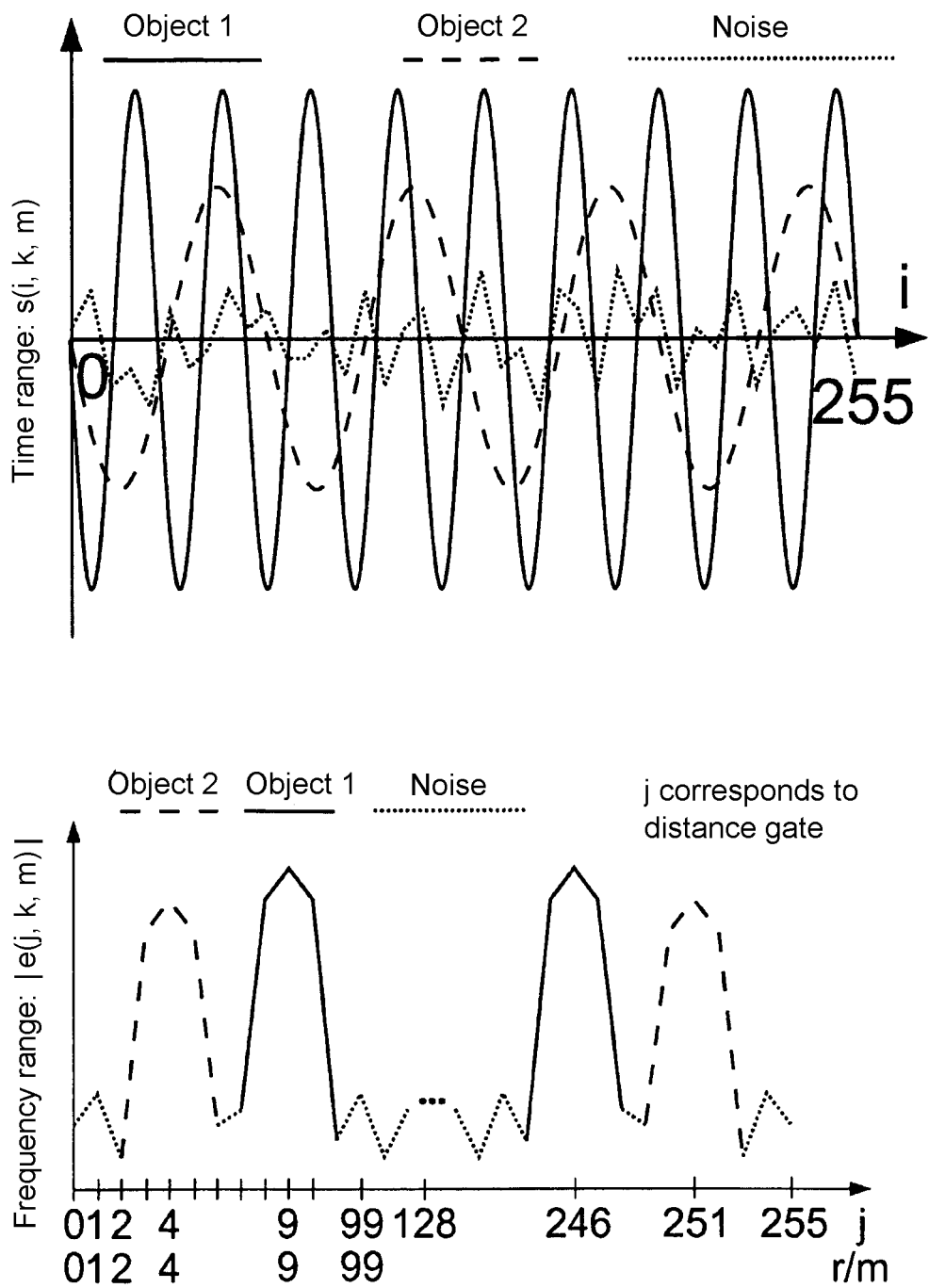
FIG. 3 shows a sampled signal in the presence of two objects before the first DFT (on the left) and after the first DFT (on the right).

A Discrete Fourier Transform (DFT) in the form of a Fast Fourier Transform (FFT) is then formed via the 256 sampled values of each frequency ramp and each receiving channel. This makes it possible to separate objects at different distances, which lead to different frequencies (see FIG. 3; on the left signal s(i,k,m) before DFT in the presence of two objects, on the right amount |e(j,k,m)| of result of the DFT; here, k is the indexed variable over the frequency ramps for each transmitting antenna and m is the indexed variable over the 8 antenna combinations $TXm_{TX}/RXm_{RX}$). Each of the discrete frequency supporting points j of the DFT corresponds to a distance r and can therefore, similarly to pulse radars, also be called a distance gate; with the above construction the distance gates merely have one distance and thus a width Δr of one meter (results from Δr·39.0625 kHz/m=1/(256·100 ns)). In the distance gates, in which objects are located, power peaks occur in the DFT. Since the sampled receiving signals are real-valued (then no additional information in the upper half of the DFT, due to symmetrical nature) and the upper transition region of the analog bandpass filter 1.5 has a frequency bandwidth of 2.1875 MHz (corresponds to the range of 56 frequency supporting points), only 100 of the 256 discrete frequency supporting points can be further processed (it should be noted that it is not possible to realize any number of narrow transition regions of filters). The filters 1.5 absorb small frequencies and consequently the receiving signals of close objects, in order to avoid an overmodulation of the amplifiers 1.6 and of the A/D converters 1.7 (the signals received at the antennas do of course get stronger as the object distance decreases).

Figure 4:
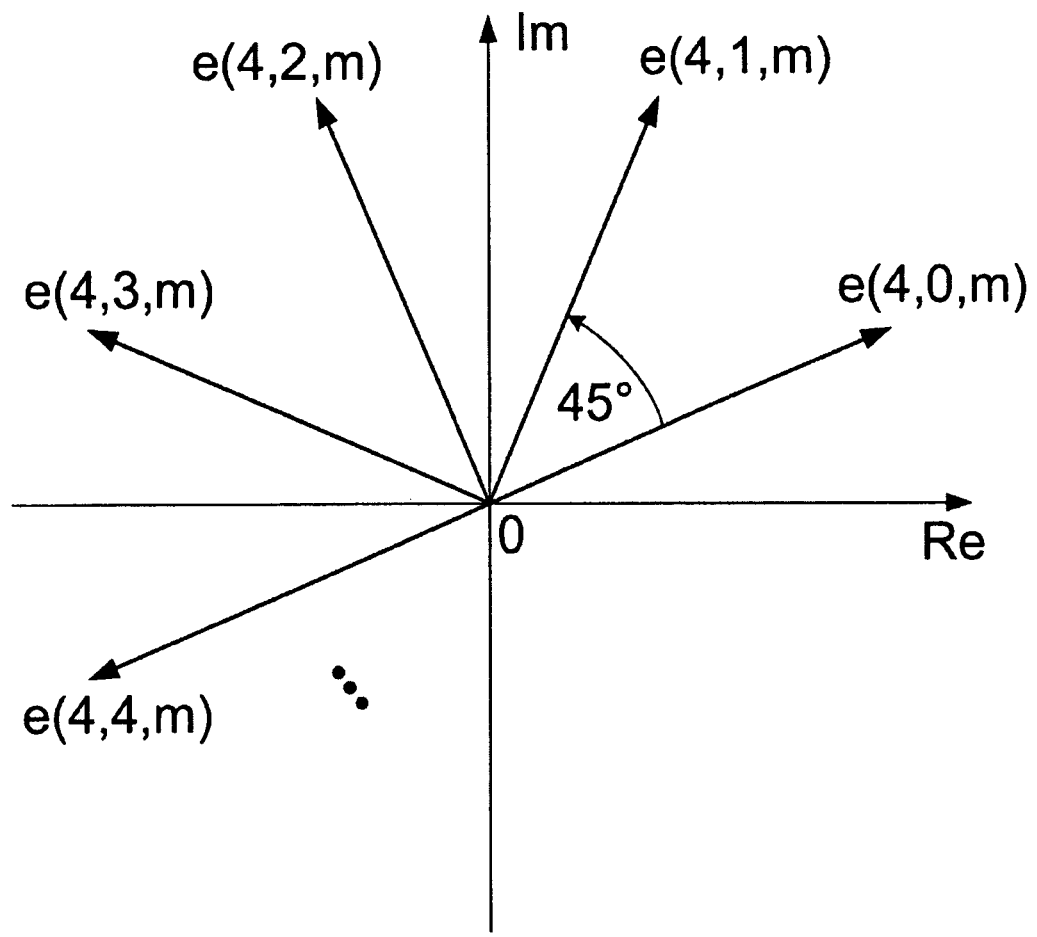
In FIG. 4 the complex spectral value rotating via the frequency ramps in the distance gate 4, in which there is exactly one object, is depicted.

Over the 256 frequency ramps (k=0, 1, . . . , 255) for each transmitting antenna $m_{TX}$ ($m_{TX}$=0,1), complex spectral values e(j,k,m) occur in each receiving channel $m_{RX}$ ($m_{RX}$=0, 1, 2, 3) for each distance gate j (i.e. each of the 100 considered frequency supporting points). If there is exactly one object at the distance corresponding to a distance gate, the complex spectral value rotates in this distance gate j over the 256 frequency ramps of each of the 8 antenna combinations m=0, 1, . . . , 7 with the Doppler frequency, since the distance (in the mm range or below) and thus the phase position of the assigned oscillation changes uniformly from frequency ramp to frequency ramp (see FIG. 4; the phase change of 45° per frequency ramp depicted there corresponds to a distance change of the object of λ/(8.2)=0.78 mm, wherein the wavelength is λ=c/24.15 GHz=12.4 mm and the factor 2 in the denominator considers the forth and back propagation of the waves, resulting in the radial relative speed $v_{rel}$=0.78 mm/80 μs=35 km/h; a positive sign of the radial relative speed is defined as an approximation). Multiple objects having a different radial relative speed in the same distance gate are separated in that a second DFT is calculated for each antenna combination and each distance gate over the complex spectral values occurring in the 256 frequency ramps. Each discrete frequency supporting point l of this second DFT corresponds to a set of Doppler frequencies (because of the sampling of the Doppler frequency it can only be determined up to a unknown integral multiple of its sampling frequency) and consequently to a set of radial relative speeds $v_{rel}$ of objects, so that the discrete frequency supporting points of the second DFT can be referred to as relative-speed-gates; for the sake of linguistic simplicity, from this point on the addition "radial" is omitted for the radial relative speed. The unambiguity range of the relative speed results from 2·$v_{rel,EB}$·80 μs=12.4 mm to $v_{rel,EB}$=280 km/h. Therefore, the relative speeds $v_{rel}$(l/256+p)·280 km/h are assigned to the relative-speed-gate l, wherein p is integral.

The second DFT does not only serve to establish the relative speed, it also increases the detection sensitivity by its integration—in the case of 256 frequency ramps by approximately 10·log$_{10}$(256)=24 dB.

Figure 5:
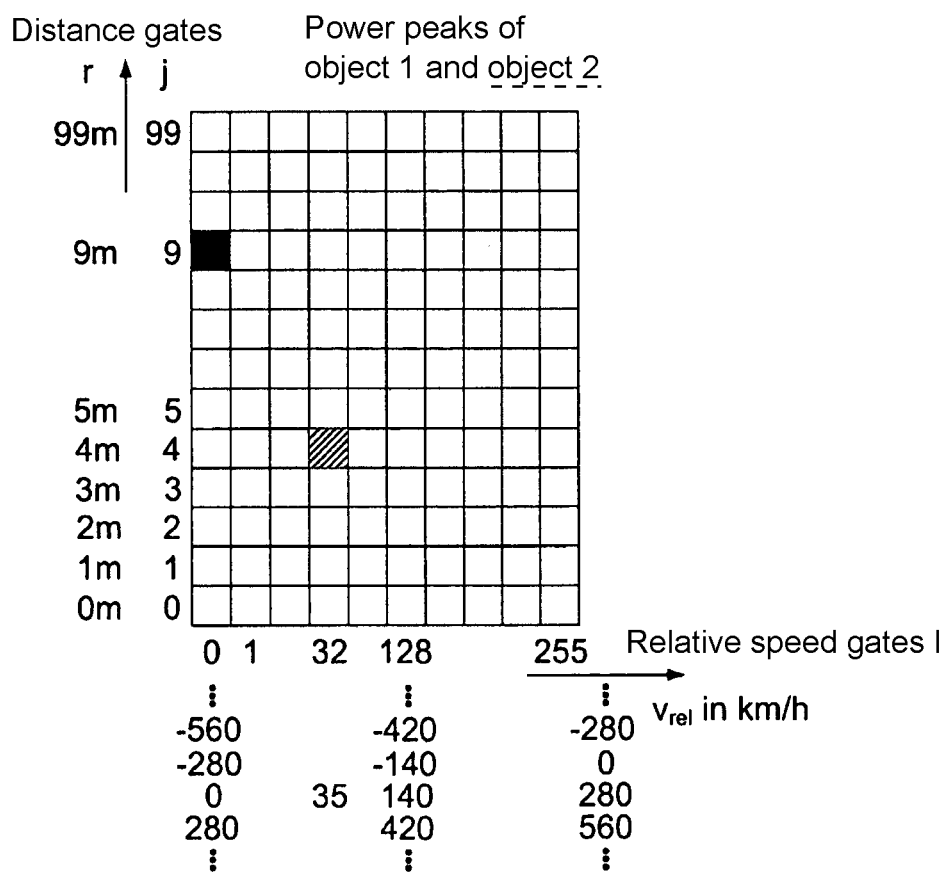
FIG. 5 schematically shows the two-dimensional complex-valued spectrum e(j,l,m) after the second DFT for an antenna combination m.

After this second DFT for the relative speeds, a two-dimensional complex-valued spectrum v(j,l,m) results for each antenna combination m, wherein the individual cells can be referred to as distance-relative-speed-gates and wherein power peaks occur at the respectively assigned distance-relative-speed-gate due to objects (see FIG. 5).

Figure 6:
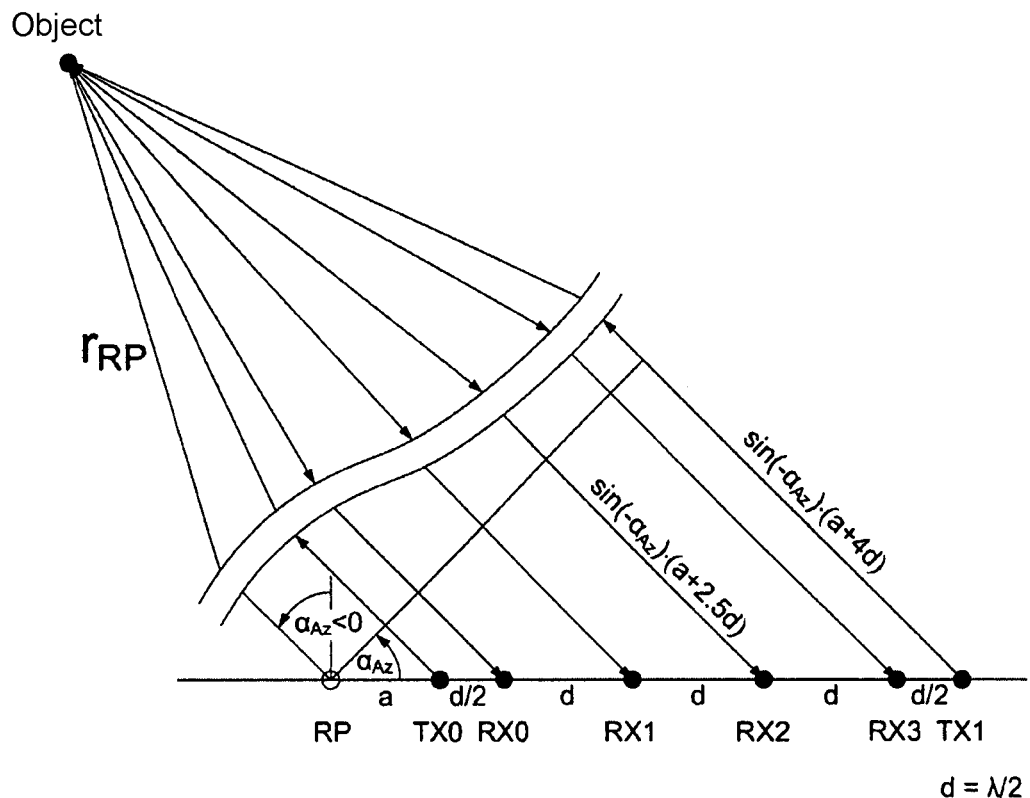
FIG. 6 shows the different path lengths between the individual antennas and a far-away stationary object relative to the sensor with an azimuth angle $\alpha_{Az}$<0.

Finally, the information from the 8 antenna combinations is then merged. The waves originating from the two transmitting antennas and reflected by an individual point-shaped object arrive at the 4 receiving antennas depending on the azimuth angle $\alpha_{Az}$ with different phase positions with respect to each other, since the distances between the object and the transmitting and receiving antennas are slightly different. This is now explained in greater detail, wherein the considered object is to first be stationary relative to the sensor, i.e. it has the relative speed zero. In FIG. 6 in a vertical projection, the phase centers of the antennas as well as the beam paths to a far-away stationary object relative to the sensor are depicted with an azimuth angle $\alpha_{Az}$<0 (positive $\alpha_{Az}$ means to the right of the perpendicular surface to the board plane) and an elevation angle $\alpha_{El}$=0 (in the horizontal perpendicular surface to the board plane); the object is so far away that the beam paths can be assumed to be parallel, i.e. the object is located in the far field of the antenna arrangement. The resulting path length r(m) for the antenna combination m=4·$m_{TX}$+$m_{RX}$ from the transmitting antenna $TXm_{TX}$ to the object and back to the receiving antenna $RXm_{RX}$ is:

$$r(m)=2\cdot r_{RP}+\sin(-\alpha_{Az})\cdot(a+m_{TX}\cdot 4d+a+d/2+m_{RX}\cdot d)$$
$$=2\cdot r_{RP}+\sin(-\alpha_{Az})\cdot(2a+d/2+m\cdot d),$$

wherein $r_{RP}$ is the path length from a reference point RP on the antenna board to the object and a is the horizontal distance between the reference point and the transmitting antenna TX0. It can be seen from this relationship that the distance changes linearly with the number m of the antenna combination. The size (2a+d/2+m·d) represents the horizontal distance of the so-called relative phase center of the antenna combination m to the reference point RP and is the sum of the horizontal distance of the assigned transmitting and receiving antenna to the reference point (the relative phase center of a combination of a transmitting and of a receiving antenna is defined here as the sum of the two vectors from a reference point to the phase centers of the transmitting and of the receiving antenna).

The resulting phase difference φ(m)−φ(0) between the receiving waves for the antenna combination m=0, 1, . . . , 7 and the antenna combination m=0, based on the different path lengths r(m), is:

$$\varphi(m)-\varphi(0)=-2\pi/\lambda\cdot[r(m)-r(0)]$$

$$=-2\pi/\lambda\cdot[2\cdot r_{RP}+\sin(-\alpha_{Az})\cdot(2a+d/2+m\cdot d)-2\cdot r_{RP}-\sin(-\alpha_{Az})\cdot(2a+d/2+0\cdot d)]$$

$$=-2\pi/\lambda\cdot\sin(-\alpha_{Az})\cdot d\cdot m=2\pi/\lambda\cdot\sin(\alpha_{Az})\cdot d\cdot m$$

and, consequently, likewise changes linearly with the number m of the antenna combination. The amplitude of the signals received at the different antenna combinations is constant, since all of the antennas have the same emission characteristic and the distance of the antennas from the far-away object for a level consideration only differs by a negligibly small amount.

Figure 7A:
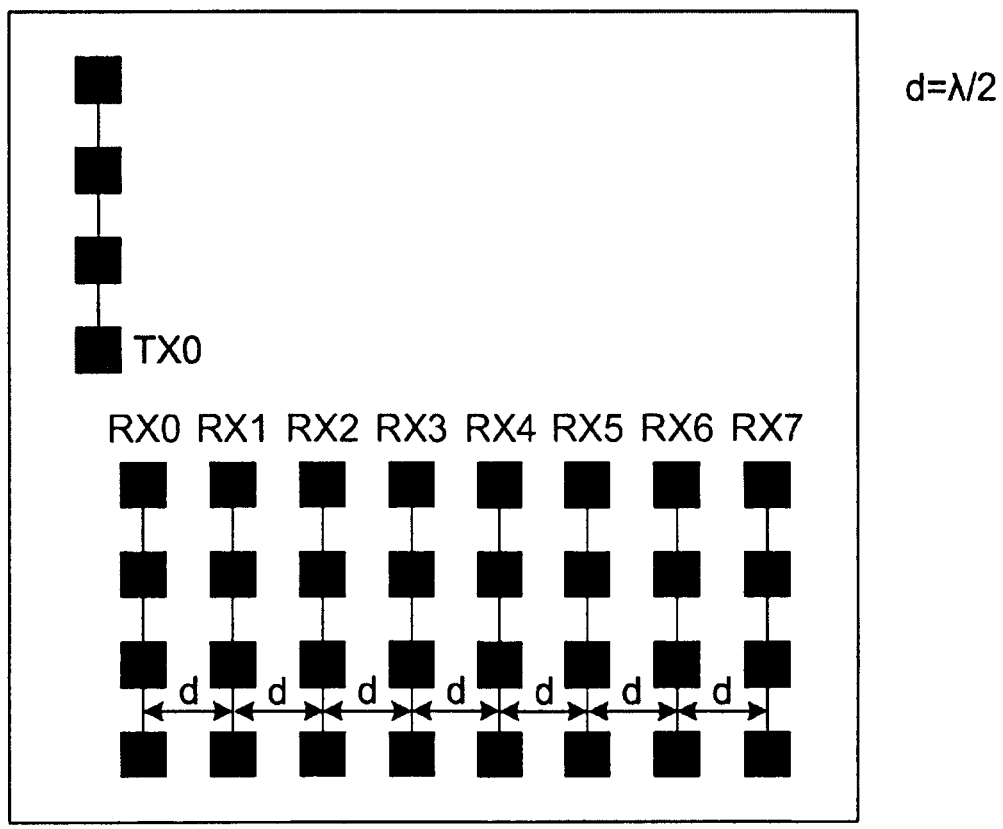
FIG. 7a shows an antenna arrangement having one transmit and 8 receiving antennas, which is equivalent to the considered antenna arrangement according to FIG. 1 having 2 transmit and 4 receiving antennas.
Figure 7B:
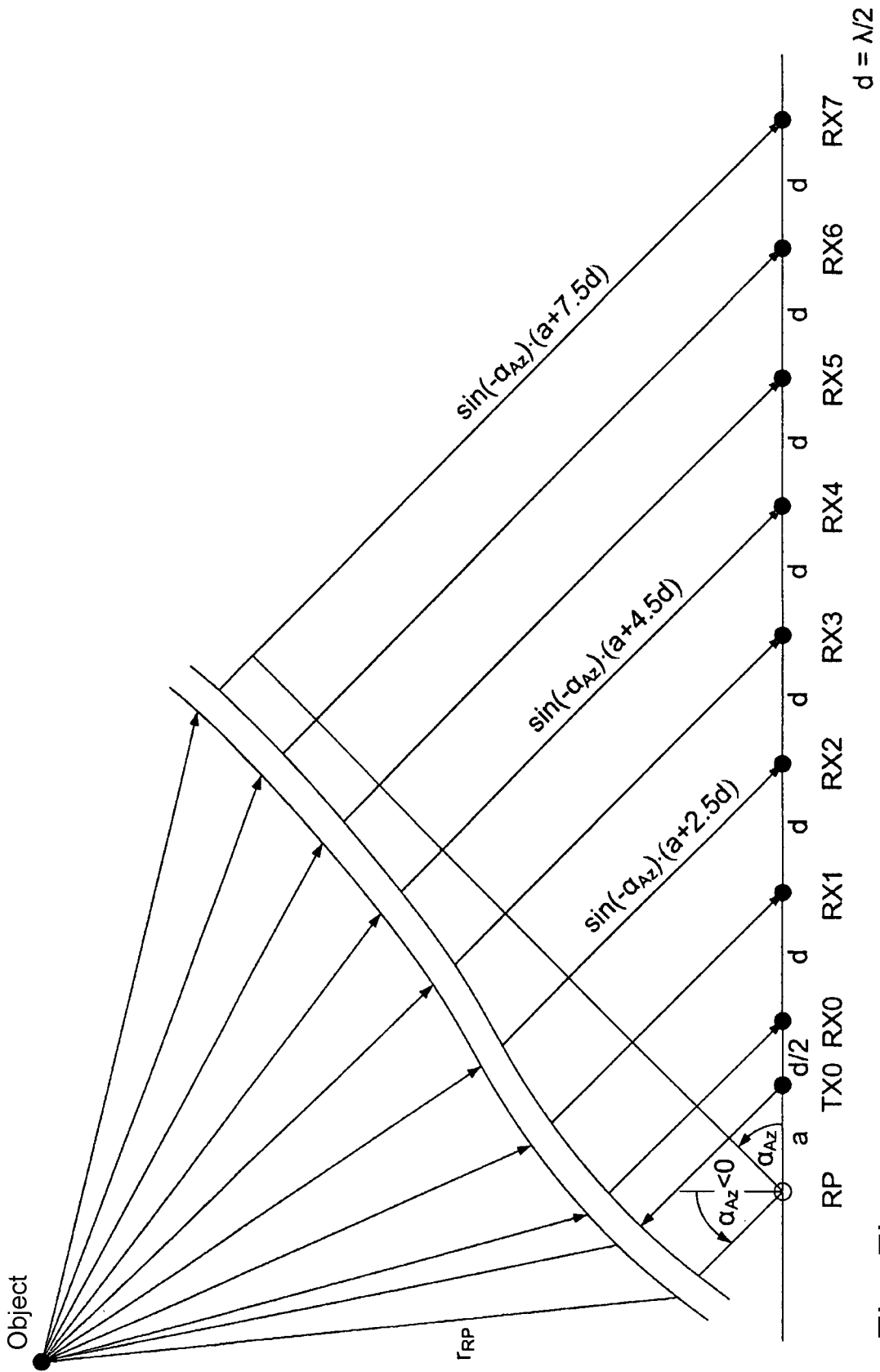
in FIG. 7b, the different path lengths between the individual antennas and a far-away stationary object relative to the sensor for this equivalent arrangement are depicted.

As is immediately obvious, for the antenna arrangement depicted in FIG. 7a with a vertical projection according to FIG. 7b exactly the same relationships for the path length r(m) and the phase difference φ(m)−φ(0) result as for the arrangement considered so far according to FIG. 1; the arrangement according to FIG. 7a only has one transmitting antenna TX0 and 8 equidistant receiving antennas RX0-RX7, wherein the antenna combination $m=m_{RX}$ is now formed from the transmitting antenna and the receiving antenna $RXm_{RX}$. Due to identical individual antennas and identical phase relationships of the antenna combinations with respect to each other, both antenna arrangements are equivalent with regard to the angle measuring capability. However, the arrangement according to FIG. 1 presented here has the advantage that it only has almost half the horizontal expansion compared to the conventional arrangement according to FIG. 7, as a result of which the sensor size can be significantly reduced. In addition, the arrangement according to FIG. 1 has fewer antennas in total (6 instead of 8 antennas), which also produces advantages in terms of price in connection with the assigned circuit parts. The disadvantage of the arrangement according to FIG. 1 is that the receiving signals to the two transmitting antennas are not acquired simultaneously—the resulting problem and the solution thereof according to the invention are depicted later.

Figure 8A:
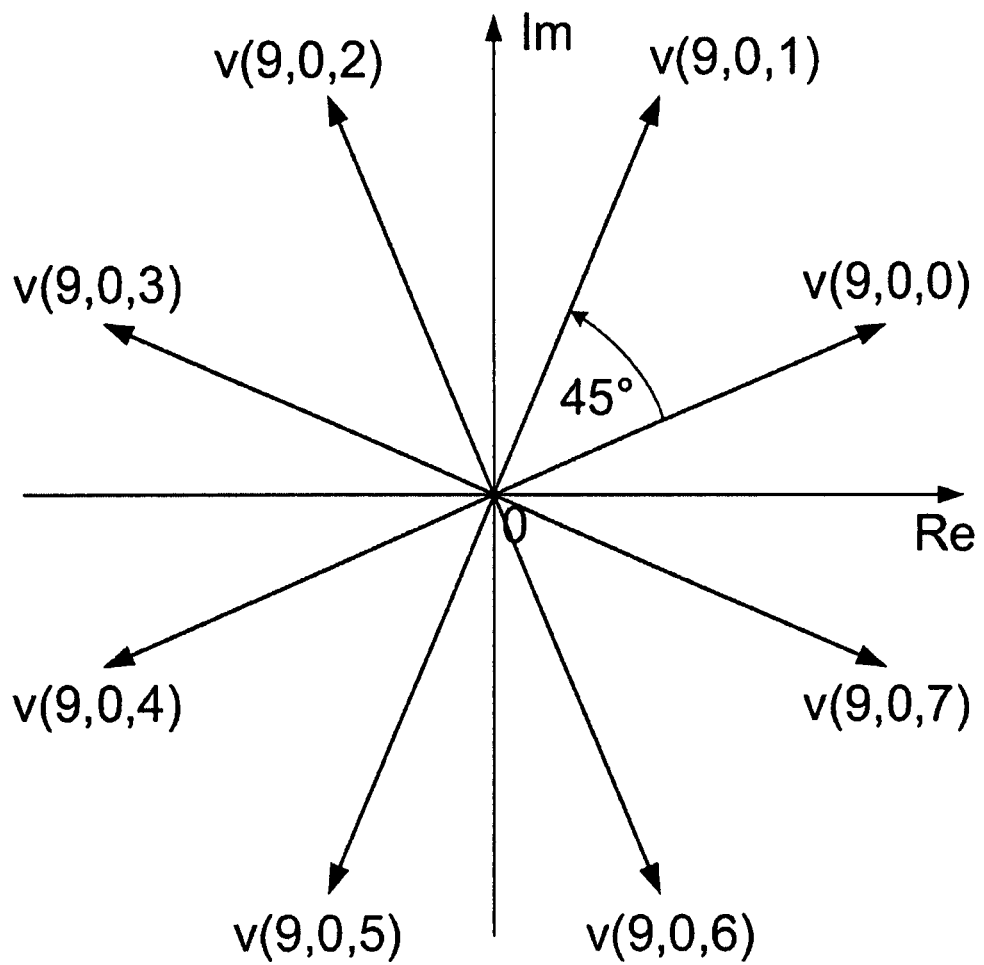
FIG. 8a shows for the above antenna arrangements the complex spectral value rotating via the antenna combinations in the distance-relative-speed-gate (9,0), in which there is exactly one object (stationary relative to the sensor)
Figure 8B:
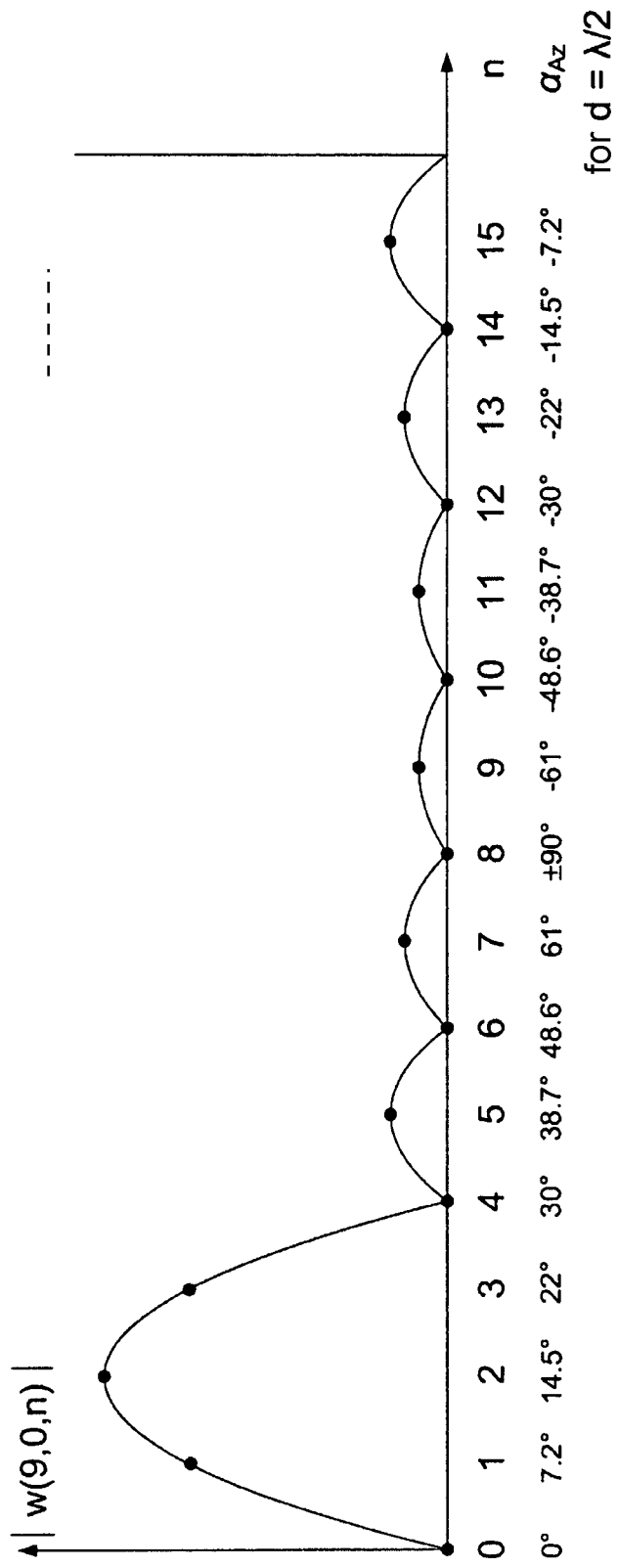
in FIG. 8b, the amount of the assigned spectrum after the third DFT is depicted.

The azimuth angle-dependent phase differences $\varphi(m)-\varphi(0)$ which increase or respectively decrease linearly over the 8 antenna combinations m are retained until after the second DFT, apart from possible constant phase shifts which can therefore be compensated (e.g. due to different line lengths); this means that if there is only one object in a distance-relative-speed-gate (j,l), the complex spectral value (j,l,m) there rotates via the 8 antenna combinations m=0, 1, ..., 7 with constant rotational speed dependent on the azimuth angle (see FIG. 8a as an example). Hence, a digital beam formation for the azimuth direction can be performed in each distance-relative-speed-gate. For this purpose, sums are created via the complex values to the 8 antenna combinations, which are each multiplied with a set of complex factors with a linearly changing phase; dependent on the linear phase change of the respective factor set, lobes with different beam directions result. The beam width of these lobes is significantly smaller than that of the individual antennas. The summation described above is realized by a 16-point-DFT, wherein the 8 values of the 8 antenna combinations are supplemented by 8 zeroes. The discrete frequency values n=0, 1, ..., 15 of this DFT correspond to different phase differences $\Delta\varphi=\varphi(m)-\varphi(m-1)=2\pi\cdot n/16$ between adjacent antenna combinations and thus to different azimuth angles $\alpha_{Az}=\arcsin(\Delta\varphi\cdot\lambda/(2\pi d))=\arcsin(n\cdot\lambda/(16d))$ and can therefore be referred to as angle gates. In FIG. 8b, the amount of the course w(j,l,n) of the spectrum of the third DFT is depicted for the proportions according to FIG. 8a, which refer to a point-shaped object at the azimuth angle $\alpha_{Az}=14.5°$ (n=2 corresponds to the depicted phase difference between adjacent antenna combinations of 45°, which corresponds to $\pi/4$, and for $d=\lambda/2$ the azimuth angle $\alpha_{Az}=\arcsin(\pi/4)=14.5°$ corresponds). The third DFT does not only serve to establish the azimuth angle, it also increases the detection sensitivity by its integration—in the case of 8 antenna combinations by approximately $10\cdot\log_{10}(8)=9$ dB.

So far it has been assumed for the determination of the azimuth angle that the object has the relative speed zero. If this is not the case, the phase between the receiving signals to the two activated transmitting antennas, which are each temporally offset by 40 µs, additionally changes proportionally to the relative speed which is assumed below to be constant, since the distance changes slightly in each case during this period of time. This phase offset within 40 µs is $\Delta\varphi_{TX}=2\cdot v_{rel}\cdot 40$ µs/$\lambda\cdot 360°$ $v_{rel}/(560$ km/h$)\cdot 2\pi$ ($\Delta\varphi_{TX}$ here in the unit radians). Since all the frequency ramps to the transmitting antenna TX1 are delayed by 40 µs to the frequency ramps to the transmitting antenna TX0, the phase of the resulting complex spectral values v(j,l,m) after the 2$^{nd}$ FFT, for the antenna combinations m=4, 5, 6, 7 belonging to the transmitting antenna TX1, has the additional phase portion $\Delta\varphi_{TX}$ with respect to the antenna combinations m=0, 1, 2, 3 belonging to the transmitting antenna TX0.

This phase offset has to be compensated before the digital beam formation, i.e. the complex spectral values v(j,l,m) for the antenna combinations m=4, 5, 6, 7 belonging to the transmitting antenna TX1 are to be multiplied with the complex unit vector $e\hat{}(-\underline{i}\cdot\Delta\varphi_{TX})$, wherein $\underline{i}$ is the imaginary unit. As explained above, the indexed variable I of the complex spectral values v(j,l,m) represents relative-speed-gates and is thereby assigned to the relative speeds $v_{rel}=(I/256+p)\cdot 280$ km/h, wherein the integral p represents the indexed variable for the ambiguity of the relative speed (thus, the relative speeds ..., −560 km/h, −280 km/h, 0 km/h, +280 km/h, +560 km/h, ... are assigned to the relative-speed-gate I=0). The phase offset $\Delta\varphi_{TX}=v_{rel}/(560$ km/h$)\cdot 2\pi$ thus results depending on the relative-speed-gate I and the indexed variables p for the ambiguity of the relative speed and is calculated by $\Delta\varphi_{TX}=(I/256+p)\cdot\pi$. Thus, the correction factor $e\hat{}(-\underline{i}\cdot\Delta\varphi_{TX})$ to be applied during the digital beam formation for antenna combinations belonging to the transmitting antenna TX1 depends on the indexed variable p for the ambiguity of the relative speed. However, additive integral multiples of $2\pi$ in $\Delta\varphi_{TX}$ do not influence the correction factor $e\hat{}(-\underline{i}\cdot\Delta\varphi_{TX})$, so that it is only necessary to distinguish between two different correction factors: correction factor $e\hat{}(-\underline{i}\cdot(I/256)\cdot\pi)$ for even-numbered p and correction factor $e\hat{}(-\underline{i}\cdot(I/256+1)\cdot\pi)=-e\hat{}(-\underline{i}\cdot(I/256)\cdot\pi)$ for odd-numbered p; the two correction factors are therefore rotated by $\pi$ in the phase, thus by half a revolution.

This can also be illustrated as follows: the sampling time for the second DFT for determining the relative speed is 80 µs (distance of the ramps for, in each case, the same transmitting antenna); the temporal offset between the two transmitting antennas, at 40 µs, is half thereof. The phase offset resulting from the second DFT is therefore to be halved, in order to obtain the relative speed-related phase offset between the two TX. However, since phases can only be accurately determined down to even-numbered multiples of $2\pi$, there remains an uncertainty of $\pi$ for the phase offset projected onto the unambiguity range of $2\pi$ of the two transmitting antennas, i.e., two phase hypotheses which differ by $\pi$ must be considered.

The third FFT for the digital beam formation, i.e. for the determination of the azimuth angle, is consequently to be performed twice for each of the 256 relative-speed-gates for each distance gate, and indeed with the two correction factors $+e\hat{}(-\underline{i}\cdot(I/256)\cdot\pi)$ and $-e\hat{}(-\underline{i}\cdot(I/256)\cdot\cdot)$ for the antenna combinations m=4, 5, 6, 7 belonging to the transmitting antenna TX1. Two different sets of relative speeds belong to the two correction factors; thus 512 relative-speed-gates result after the digital beam formation.

Figure 9:
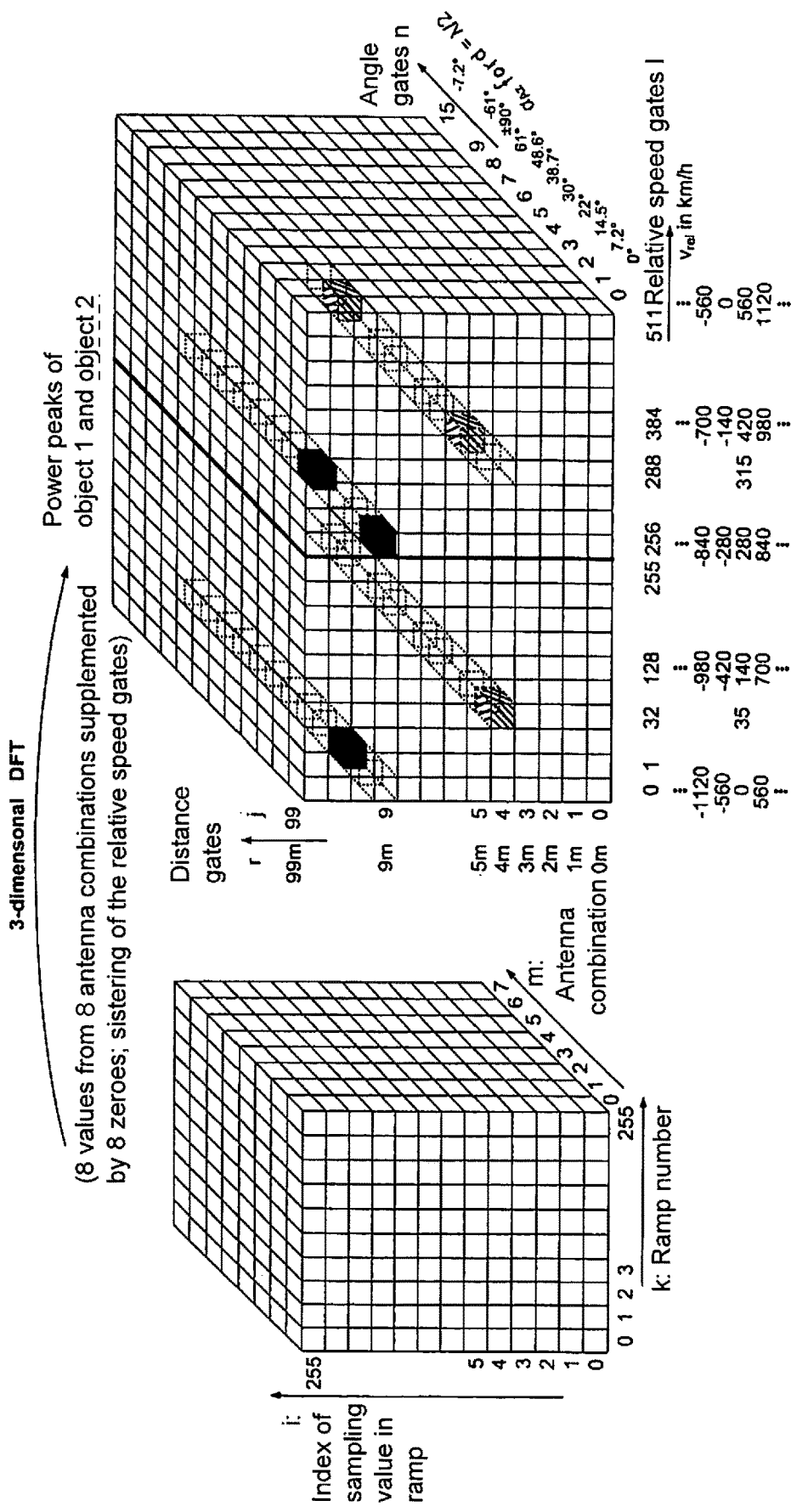
FIG. 9 schematically shows the data arrangement before the three-dimensional DFT (on the left) and the three-dimensional complex-valued spectrum w(j,l,n) thereafter (on the right).

After this third DFT for the azimuth angles, a three-dimensional complex-valued spectrum w(j,l,n) results, wherein the individual cells can be referred to as distance-relative speed-angle-gates and power peaks can occur due to objects at the respectively assigned distance-relative-speed-angle-gate (see FIG. 9; on the left data arrangement before three-dimensional DFT, on the right thereafter). By sistering the relative-speed-gates during the digital beam formation, power occurs as a result of each object in two relative-speed-gates spaced by 256 (see below for further treatment of this effect).

Thus, by determining the power peaks objects can be detected, and their dimensions distance, relative speed (apart from ambiguities) and azimuth angle can be established. Since power peaks caused by the DFT-windowing still have levels also in adjacent cells, the object dimensions can be determined by interpolation depending on these levels substantially more accurately than the gate width. It should be noted that the window functions of the three DFTs are selected such that, on the one hand, the power peaks do not become too wide (for a sufficient object separation) but, on the other hand, the side lobes of the window spectra also do not become too high (in order to be able to also detect weakly-reflective objects in the presence of highly-reflective objects). From the height of the power peaks its reflection cross-section can also be estimated as the fourth object dimension, which indicates how strongly the object reflects the radar waves. Due to the noise present in each system (e.g. due to thermal noise) a certain power level results after the three-dimensional DFT even without received object reflections; this noise level which varies to a certain extent due to statistical effects represents the lower physical limit of the detection ability.

The detection threshold, above which objects are formed from power peaks, is approximately 12 dB above the mean noise.

Up to now, point-shaped objects (i.e. neither expanded in width nor in length) have primarily been considered with a constant radial relative speed and without lateral movement. Then, the power peaks are "sharp" after the three-dimensional Fourier transform; their form corresponds to the three-dimensional discrete Fourier transform of the window functions shifted by the position of the three object sizes speed, distance and angle—with reference to, in each case, one of the dimensions speed, distance and angle, the form of the power peaks is the one-dimensional discrete Fourier transform of the respective window function shifted by the respective object sizes. Objects, for which the above conditions do not apply, have "blurred" power peaks after the three-dimensional Fourier transform.

The described detection of objects and the determination of the assigned object dimensions represent one measuring cycle and supply an instantaneous picture of the environment; this is repeated cyclically approximately every 40 ms. In order to judge the environment situation, the instantaneous images are monitored, filtered and evaluated throughout successive cycles; the reasons for this are in particular:
  some sizes cannot be determined directly in one cycle, but only from the change which takes place over successive cycles (e.g. longitudinal acceleration and lateral speed),
  the movement of objects can be checked for plausibility over multiple cycles, resulting in a more robust and safer description of the environment; the change in the (radial) distance resulting over successive cycles must e.g. fit the measured (radial) relative speed, which results in redundancy and thus additional safety in the description of the environment,
  reduction of measuring noise by temporal filtering over multiple cycles.

The monitoring and filtering of object detections over successive cycles is also referred to as tracking. Here, values for the next cycle are predicted for each object from the tracked object dimensions of the current cycle. These predictions are compared with the objects and their object dimensions detected in the next cycle as a snapshot, in order to allocate them to each other in a suitable manner. The predicted and measured object dimensions belonging to the same object are then merged, producing the current tracked object dimensions which consequently represent filtered values over successive cycles. If certain object dimensions cannot be clearly determined in one cycle, the different hypotheses are to be considered during the tracking. The environment situation for the respective driver assistance function is analyzed and interpreted from the tracked objects and the assigned tracked object dimensions, in order to derive the appropriate actions therefrom.

Figure 10:
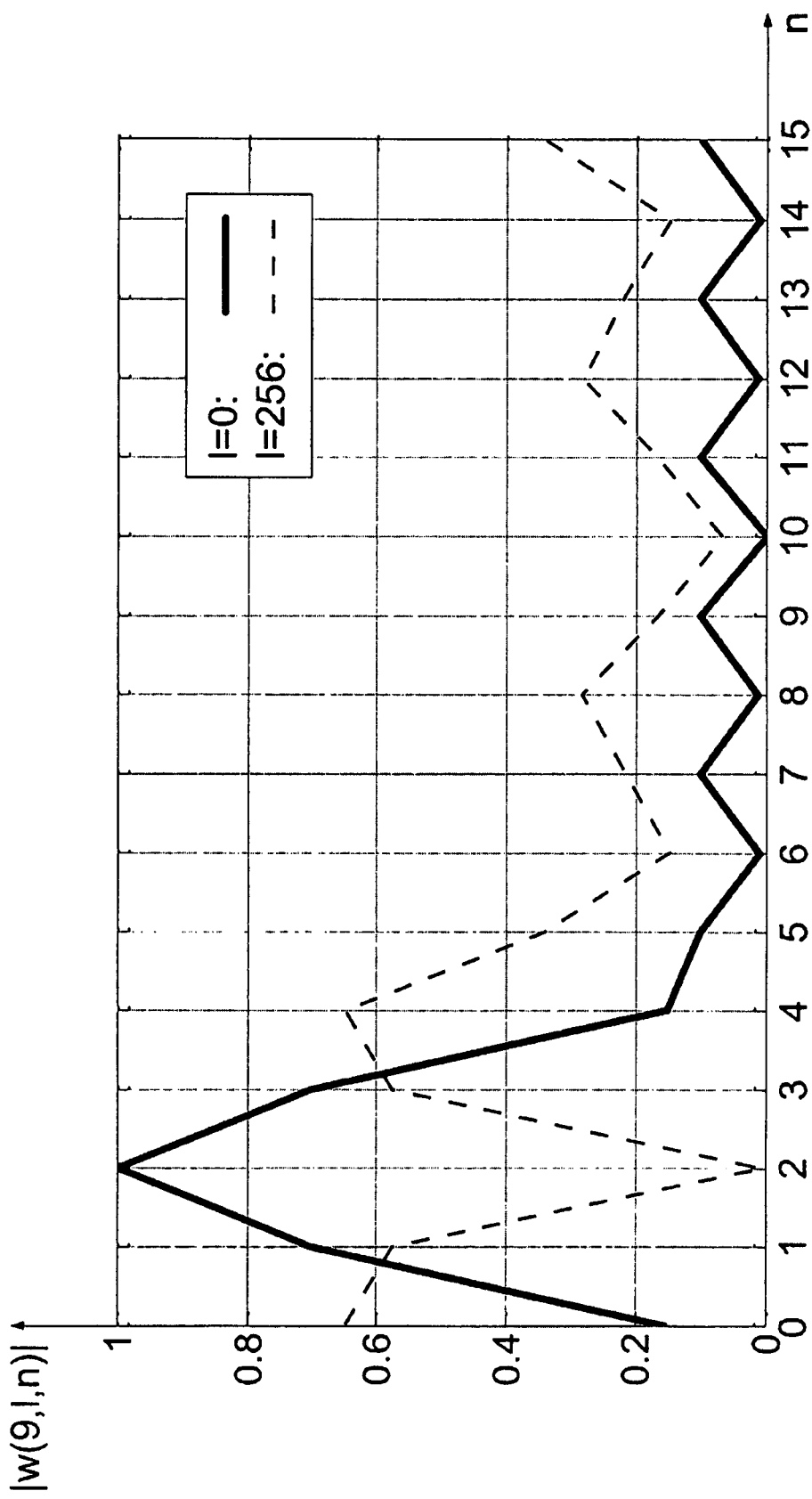
FIG. 10 shows, for an object at a 9 m distance and having the relative speed 0 km/h, the amount of the courses of the angle spectra w(9,l,n) in the two relative-speed-gates l=0 and l=256, wherein a Chebyshev window having a side lobe suppression of 20 dB is used as the window function for the third DFT.

It shall now be explained how the effect described above can be dealt with in that an object generates power in the three-dimensional complex-valued spectrum $w(j,l,n)$ in two relative-speed-gates spaced at 256. As indicated in FIG. 9, e.g. a point-shaped object produces, at the distance r=9 m, with the relative speed $v_{rel}$=0 km/h and at the azimuth angle $\alpha_{Az}$=14.5°, power peaks in the relative-speed-gates I=0 and I=256 with the assigned sets of possible relative speeds. In FIG. 10, the amount of the courses of the so-called angle spectra $w(9,l,n)$ are depicted more accurately in the two relative-speed-gates I=0 and I=256, wherein a Chebyshev-window with side lobe suppression of 20 dB is used as the window function for the third DFT. For the relative-speed-gate I=0, which comprises the actual relative speed hypothesis $v_{rel}$=0 km/h, a single sharp power peak results—the course of the angle spectrum corresponds to the discrete Fourier transform of the used window function shifted by the angle $\alpha_{Az}$=14.5° of the object, as expected for the assumed point-shaped object. For the other relative-speed-gate I=256, which does not comprise the actual relative speed hypothesis $v_{rel}$=0 km/h, a double power peak results—for this "wrong" relative-speed-gate hypothesis, the correction factor used for the antenna combinations m=4, 5, 6, 7 belonging to the transmitting antenna TX1 is the factor of −1 "wrong", i.e. an additional "wrong" phase jump of π is inserted between the first and the second four antenna combinations, as a result of which a zero point is generated at the maximum of the "correct" spectrum (which is produced without this phase jump) and the power is pressed into two equally high peaks around the zero point; this angle spectrum does not therefore fit the expected course for a point-shaped object.

One possible criterion for distinguishing between a correct and wrong relative-speed-gate hypothesis is therefore the better conformity to the spectrum of a point-shaped object, which corresponds to the discrete Fourier transform of the used window function shifted by the azimuth angle of the object. For this purpose, signal parameter estimation methods known from the literature can be used. This determination of the correct hypothesis is usefully only done in relative-speed-gates, in which a power peak lies above the detection threshold. Then the probability is also low that the superimposed system noise will lead to the wrong hypothesis being selected. If a scenario exists where multiple objects form power in the same distance and relative-speed-gate, then the probability of this criterion leading to the wrong hypothesis is low; however, in the case of a system construction such as the one proposed by way of example here, the probability of such a scenario is already low because of the high resolution in distance and relative speed.

In FIG. 10, the level of the amounts of the angle spectra is scaled to the maximum for the actual, i.e. correct, hypothesis of the relative-speed-gate, i.e. this maximum is the value 1; the level of the double peak of the wrong relative-speed-gate hypothesis is then approximately the value 0.64, that is to say almost 4 dB lower. It is thus possible to distinguish between the correct and wrong relative-speed-gate hypotheses by comparing the levels of the maximums of the amounts of the two angle spectra—the angle spectrum having the higher maximum amount belongs to the correct hypothesis. This method is obviously easier to implement than most of the signal parameter estimation methods, but it is nevertheless really robust.

The approaches presented so far determine the correct relative-speed-gate hypothesis at detection level, that is to say in one measuring cycle. Other methods result from comparing or respectively monitoring detections over successive measuring cycles, that is to say in particular by tracking.

Here, the simplest approach is tracking both relative-speed-gate hypotheses and then rejecting the hypothesis, where the change in the measured distance turns out to not be consistent with the relative-speed-gate hypothesis.

Multiple at least theoretical relative speeds correspond to each of the 512 relative-speed-gates; in the case of the construction considered here, these relative speeds have a raster of 560 km/h so that, in normal road traffic, there is always only one realistically possible hypothesis for each relative-speed-gate. However, this is not the case with other constructions (e.g. greater distance of the frequency ramps or radar frequency in the 77 GHz band), i.e. there are multiple possible hypotheses for each relative-speed-gate. In order to determine the correct one of these hypotheses, the normal tracking can also be used again, that is to say based on the comparison between the change in the measured distance and the assumed relative speed hypothesis. In general, however, this approach needs multiple measuring cycles in order to determine the correct hypothesis and requires significant computational effort. DE 102009016480 A1 explains one possible method of determining the correct relative speed hypothesis more effectively and better. For this purpose, the distance of the frequency ramps is varied from measuring cycle to measuring cycle; as a result, the raster of the ambiguities of the relative speed is different from measuring cycle to measuring cycle, and only the correct hypothesis is confirmed across two measuring cycles (that is to say, only this one hypothesis is included in the sets of hypotheses of the two measuring cycles).

This approach of varying the ramp distance from measuring cycle to measuring cycle can now also be used to determine the correct one of the two relative-speed-gate hypotheses due to the temporal offset between the two transmitting antennas. In the construction considered so far, the frequency ramps have a temporal distance of 40 μs, resulting in an offset of 280 km/h for the two relative-speed-gate hypotheses. If the ramp distance is now increased in the next measuring cycle by e.g. 10% to 44 μs, then the offset of the two relative-speed-gate hypotheses reduces to 255 km/h; only the correct relative-speed-gate hypothesis can therefore be confirmed across two measuring cycles—the power for the wrong relative-speed-gate hypothesis is not displayed in the expected relative-speed-gate.

The determination of the correct relative speed (gate) hypothesis just described must in principle only be performed during the re-recording of an object. If an object has been clearly recorded, that is to say the correct relative speed hypothesis has been determined, it can then be investigated in the further measuring cycles, during the association in the tracking, whether a suitable relative speed hypothesis is present among the possible relative speed hypotheses of a suitable detection from the location (distance, angle) to the tracked object, and the others can be rejected.

The respectively 256 frequency ramps for each transmission signal are interleaved with each other in the considered example. In principle, the idea of only making 256 frequency ramps with one transmitting antenna and thereafter 256 frequency ramps with the other could be conceived; the transmitting antennas would thus not be serially interleaved but would be operated completely serially. The temporal offset between the transmitting antennas would then, admittedly, be much larger, so that inaccuracies in the measurement of the relative speed and radial relative accelerations of objects would lead to unacceptably large errors in the determination of the relative speed-related phase offset between the receiving signals of the two transmitting antennas and, consequently, the result of the digital beam formation would be considerably distorted to an unacceptable level. Therefore, the interleaved operation of the transmitting antennas is an essential part of the approach according to the invention.

The basic idea according to the invention has been presented with reference to the above example: in order to be able to realize a digital beam formation for high angle accuracy or respectively resolution over a large number of antenna channels, without the number of individual antennas and the required area as well as the required hardware outlay becoming too great, multiple transmitting and multiple receiving antennas are used and arranged so that the number of antenna channels is the product of the number of transmitting antennas times the number of receiving antennas. For a high sensor sensitivity, all of the receiving antennas are operated simultaneously and their received signals evaluated. The transmitting antennas are operated alternately, in order to thus be able to separate the assigned receiving signals. To obtain a correct digital beam formation, it must be taken into consideration that the temporal offset between the transmitting antennas leads to a phase offset dependent on the relative speed, which is to be corrected. Due to ambiguities, different hypotheses, which correspond to various relative speed hypotheses, are generally to be considered for this phase offset. In order to determine the correct hypothesis, one of the presented approaches can be used.

It is immediately obvious to the person skilled in the art that this idea can be generalized starting from the example depicted in detail above to other designs and constructions; some examples are as follows:

- Instead of two transmitting antennas, more transmitting antennas (number NS) can also be used. The digital beam formation is then to be performed NS times for each relative-speed-gate after the second DFT and the correct hypothesis is to be determined from the NS relative-speed-gate hypotheses.
- Parameters of the transmission signals (e.g. mid-frequency) and of the temporal progression (e.g. distance of the frequency ramps) can also vary slightly between frequency ramps which, in particular, helps to suppress interference due to external radiation or internal sources of interference.
- Different spectral analysis methods to the DFT are used for a significant non-equidistant distance of the frequency ramps.
- Instead of a frequency modulation, an amplitude modulation in the form of short transmission pulses can also be used, wherein the distance gates are formed directly by temporal sampling of the receiving signal.
- NG>=2 transmitting antennas can, in each case, also be operated simultaneously if the transmission signals thereof are modulated with respect to each other (e.g. via the phase) for a later separation. A switchover is then periodically made between NS>=2 such groups at simultaneously operated transmitting antennas; in total, there are therefore NS×NG transmitting antennas.

Following separation of the receiving signals originating from simultaneously operated transmitting antennas by demodulation, the digital beam formation can then be performed via NG×NS×NE antenna combinations, wherein the phase offsets between the transmitting antenna groups have to be considered.

The roles of transmitting and receiving antennas can also be permutated, i.e. the receiving antennas are operated alternately and the transmitting antennas are operated simultaneously.

In addition to 24 GHz, other frequency bands can also be used, in particular the 77 GHz and 79 GHz bands.

The invention claimed is:

1. A method for the environmental detection of a motor vehicle, comprising the following steps:
   emitting transmission signals using NS≥2 transmitting antennas, wherein in each case, the considered transmission signals consist of a sequence of N identical or similar single signals,
   receiving transmission signals reflected off objects using NE>=2 receiving antennas, and
   processing the received signals,
wherein
   in each case, transmitting is done on only one of the NS transmitting antennas, wherein from single signal to single signal, the transmitting antenna used alternates cyclically, and within each of the NP=N/NS periods of the cyclical transmitting antenna alternation, the temporal progression is at least approximately the same, and
   in order to receive single signals reflected off objects, all considered NE receiving antennas are always used in parallel,
characterized in that
   each of the NP received single signals are accumulated in proper phase for the NS×NE different combinations of transmitting and receiving antennas to plural relative speed hypotheses of objects,
   by way of said NS×NE accumulated values, each belonging to the same relative speed hypothesis, from different combinations of transmitting and receiving antennas, a digital beam formation is performed, and those phase differences are thereby taken into consideration, which arise between the receiving signals to the different transmitting antennas due to their temporal offset because of the cyclical transmitting antenna alternation, and which depend on the respective relative speed hypothesis,
   the considered NS×NP transmission signals are located at least approximately in a temporally equidistant raster,
   each of the NP received single signals are added up in proper phase for the NS×NE different combinations of transmitting and receiving antennas by way of a Discrete Fourier Transform (DFT), wherein each of the frequency supporting points of the DFT corresponds to a group of equidistant relative speed hypotheses,
   a digital beam formation is performed by way of the NS×NE DFT values of a respective frequency supporting point multiple times with different phase differences, since there are various hypotheses for the phase differences between the receiving signals to the different transmitting antennas for each frequency supporting point NS, which hypotheses can be distinguished in the limited phase unambiguity range of 360°, wherein these different phase difference hypotheses correspond to different subgroups of the relative speed hypotheses of this frequency supporting point,
   wherein that one of the different phase difference hypotheses of a DFT frequency supporting point is selected for which the result of the digital beam formation best fits the hypothesis of an individual point-shaped object, or
   wherein that one of the different phase difference hypotheses of a DFT frequency supporting point is selected which has the largest maximum in the result of the digital beam formation, or
   wherein the correct one of the different phase difference hypotheses is determined in that the assigned different relative speed hypotheses are compared with the change in the measured distance of the object and/or respectively or with the already known relative speed of the object, over two or more measuring cycles, or
   wherein the distance of the individual transmission signals varies from measuring cycle to measuring cycle and in which the correct one of the different phase difference hypotheses is determined in that the assigned different varying relative speed hypotheses are compared with each other over two measuring cycles.

2. The method according to claim 1, in which only the selected phase difference hypothesis of a DFT frequency supporting point and the assigned subgroup of relative speed hypotheses are further considered.

3. The method according to claim 1, in which
   the frequency of the emitted single signals is modulated linearly,
   each of the NP received single signals for the NS×NE different combinations of transmitting and receiving antennas is sampled in an equidistant raster NA-times and a first DFT is formed by way of these NA sampled values, and
   a second DFT is determined for each frequency supporting point of this first DFT via each of the NP receiving signals, wherein each frequency supporting point of the second DFT corresponds to a group of equidistant relative speed hypotheses.

4. The method according to claim 1, in which there are NS>=2 groups of, in each case, NG>=2 transmitting antennas which are simultaneously operated and modulated with respect to each other with regard to signals, which transmitting antennas are separated by receiving signals originating from various simultaneously operated transmitting antennas by demodulation and the digital beam formation is performed over NG×NS×NE antenna combinations.

5. A radar system for the environmental detection of a motor vehicle, using the method according to claim 1, wherein said system comprises
   transmitting means for emitting transmission signals using NS≥2 transmitting antennas, receiving means for receiving transmission signals reflected off objects using NE>=2 receiving antennas, and
   signal processing means for processing the received signals,
wherein
   in each case only one of the NS transmitting antennas is ready to transmit, wherein from single signal to single signal, the transmitting antenna used can in particular be alternated cyclically and within each of the NP=N/NS periods of the cyclical transmitting antenna alternation, the temporal progression is at least approximately identical,
   the NE receiving antennas can be used for the parallel reception of single signals reflected off objects, characterized in that
- the NP received single signals in each case for the NS×NE different combinations of transmitting and receiving antennas can be accumulated in proper phase to plural relative speed hypotheses of objects, and
- by way of said NS×NE accumulated values, each belonging to the same relative speed hypothesis, from different combinations of transmitting and receiving antennas, a digital beam formation can be performed, and those phase differences can thereby be taken into consideration, which arise between the receiving signals to the different transmitting antennas due to their temporal offset because of the cyclical transmitting antenna alternation, and which depend on the respective relative speed hypothesis, wherein the signal processing means are configured to execute said method.

\* \* \* \* \*

UNITED STATES PATENT AND TRADEMARK OFFICE
CERTIFICATE OF CORRECTION

PATENT NO. : 10,823,836 B2  
APPLICATION NO. : 15/776217  
DATED : November 3, 2020  
INVENTOR(S) : Markus Wintermantel Page 1 of 1

It is certified that error appears in the above-identified patent and that said Letters Patent is hereby corrected as shown below:

In the Specification

Column 3,  
Line 36, after "relative-speed-gates" replace "I=0" with --l=0--;  
Line 37, after "and" replace "I=256," with --l=256,--;

Column 5,  
Line 40, after "λ/" replace "(8.2)" with --(8·2)--;  
Line 61, after "$v_{rel}$" replace "(I/256+p)" with --(l/256+p)--;  
Line 62, after "relative-speed-gate" replace "I," with --l,--;

Column 8,  
Line 13, after "variable" replace "I" with --l--;  
Line 15, after "$v_{rel}$=" replace "(I/" with --(l/--;  
Line 20, after "relative-speed-gate" replace "I=0)." with --l=0).--;  
Line 21, after "relative-speed-gate" replace "I" with --l--;  
Line 23, after "$\Delta\varphi_{TX}$=" replace "(I/256+p)" with --(l/256+p)--;  
Line 33, after "(-i·" replace "(I/256)" with --(l/256)--;  
Line 34, after "rection factor e^(-i·" replace "(I/256" with --(l/256--;  
Line 34, after "=-e^(-i·" replace "(I/256)" with --(l/256)--;  
Line 55, after "+e^(-i·" replace "(I/256)" with --(l/256)--;  
Line 55, after "-e^(-i·" replace "(I/256)··)" with --(l/256)·π--;

Column 10,  
Line 19, after "relative-speed-gates" replace "I=0" with --l=0--;  
Line 20, before "with" replace "I=256" with --l=256--;  
Line 23, after "relative-speed-gates" replace "I=0 and I=256," with --l=0 and l=256,--;  
Line 26, after "gate" replace "I=0," with --l=0,--;  
Line 32, after "gate" replace "I=256," with --l=256,--.

Signed and Sealed this  
First Day of June, 2021

Drew Hirshfeld  
*Performing the Functions and Duties of the*  
*Under Secretary of Commerce for Intellectual Property and*  
*Director of the United States Patent and Trademark Office*